United States Patent
Yoshikawa

(10) Patent No.: US 6,717,618 B1
(45) Date of Patent: Apr. 6, 2004

(54) ADAPTER DEVICE FOR CONNECTING A PHOTOGRAPHIC OPTICAL SYSTEM TO A CAMERA

(75) Inventor: Kazumasa Yoshikawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,927

(22) Filed: Aug. 24, 1999

(30) Foreign Application Priority Data

Aug. 25, 1998 (JP) .......................................... 10-238775

(51) Int. Cl.⁷ ........................ G03B 17/00; H04N 5/225
(52) U.S. Cl. ........................ 348/360; 348/347; 348/375; 396/530
(58) Field of Search ................................ 348/335, 345, 348/347, 357, 360, 361, 373, 374, 375; 396/71, 529, 530, 531, 532; H04N 5/225; G03B 17/00

(56) References Cited

U.S. PATENT DOCUMENTS

| | | | | |
|---|---|---|---|---|
| 5,003,399 A | * | 3/1991 | Ishimaru | 348/361 |
| 5,731,920 A | * | 3/1998 | Katsuragawa | 359/827 |
| 5,877,811 A | * | 3/1999 | Iijima | 348/375 |
| 6,336,754 B1 | * | 1/2002 | Sato | 396/529 |
| 6,392,702 B1 | * | 5/2002 | Arai | 348/360 |
| 6,407,774 B1 | * | 6/2002 | Mabuchi | 348/335 |

* cited by examiner

Primary Examiner—Ngoc-Yen Vu
(74) Attorney, Agent, or Firm—Morgan & Finnegan, LLP

(57) ABSTRACT

The invention provides a device for making parallel interface communication compatible with serial interface communication when a serial interface compatible large television lens is used for a portable television camera, thereby performing optimal communication between the television camera and lens. In the arrangement of this invention, the terminals of the television lens are connected to the terminals of the camera via an adapter device, and a changeover switch is used to connect the terminals in accordance with serial or parallel communication, thereby setting compatibility between serial and parallel communications.

32 Claims, 4 Drawing Sheets

US 6,717,618 B1

ADAPTER DEVICE FOR CONNECTING A PHOTOGRAPHIC OPTICAL SYSTEM TO A CAMERA

BACKGROUND OF THE INVENTION

1. Field of the Invention

The present invention relates to an electrical interface between a television camera and television lens.

2. Related Background Art

Electrical interfaces between the television camera and television lens are mainly classified into a 36-pin parallel (analog) interface using a 36-pin connector for a high-performance, multifunctional, expensive large television camera and large television lens and a 12-pin parallel (analog) interface using a 12-pin connector for compact, lightweight, low-cost portable television camera and television lens. One function is assigned to each pin of each of these electrical interfaces. For example, an iris control signal for controlling the iris of the television lens from the television camera is assigned to the fifth pin of the 12-pin parallel interface for the portable television camera and to the 17th pin of the 36-pin parallel interface for the large television camera.

FIG. 4 is a block diagram of a 12-pin parallel interface between the conventional portable television camera and portable television lens. The electrical interface between a portable television camera 200 and portable television lens 700 has a 12-pin connector 500 (only the 1st, 3rd, 4th, 5th, 6th, and 7th pins are illustrated, and an illustration of other pins is omitted). In the direction from the portable television camera 200 to the portable television lens 700, the electrical interface sends a switch input signal mainly having a function of switching the iris automatically or manually and an analog input signal represented by the iris control signal. In the direction from the portable television lens 700 to the portable television camera 200, the electrical interface sends a switch output signal mainly having a function of ON/OFF-switching VTR recording and an analog output signal represented by an iris position signal.

The internal arrangement of the portable television lens 700 will be described below.

The switch input signal is input to an analog control signal calculation portion 115 to make the portable television lens 700 function in accordance with the contents of the switch input signal. The analog input signal is sequentially supplied to the analog control calculation portion 115, a driver circuit 111 for driving a motor, and a motor 110 for operating an optical system (not shown) such as a focus lens group, zoom lens group, iris blades, and extender lens group. A position detector 108 for detecting the state of the optical system in cooperation with the motor 110 is attached to the optical system. A signal from the position detector 108 is output as an analog output signal to the portable television camera 200 via an analog position signal calculation portion 109. Information from a switch 119 in the portable television lens 700 is also output as a switch output signal to the portable television camera 200.

In recent years, along with the improvement in performance of portable television cameras, a large television lens is often used for a portable television camera. In this case, a 36-pin/12-pin interface conversion adapter is generally used between the portable television camera and large television lens.

To implement higher performance to cope with a virtual studio, a 12-pin parallel interface and 36-pin parallel interface as an electrical interface between a television camera and television lens, and a 12-pin serial interface and 36-pin serial interface assigned with a function of two-way serial communication from a television camera to television lens and from a television lens to television camera are used more often because further expansion and higher precision are difficult with state-of-the-art electrical interfaces for television camera lenses. With reference to the presence/absence of serial communication, the interface of a television lens having such a serial communication function is automatically switched to a serial interface when a television camera to which the television lens is attached has a serial communication function or to a parallel interface when a television camera to which the television lens is attached does not have a serial communication function.

Serial communication functions are assigned to parallel interfaces as follows. In the 12-pin parallel interface, the serial communication function is assigned to the 11th pin as a focus position signal pin which is rarely used and the 12th pin as an unused pin.

In the 36-pin parallel interface, the serial communication function is assigned to the extender position signal pin and iris mode changeover signal since no unused pin is available. The function of serial communication from the television lens to television camera is assigned to the 11th pin in the 12-pin serial interface and the 8th pin in the 36-pin serial interface. In use of a large television lens having a serial communication function in a portable television camera having a serial communication function, conversion must be performed by a 36-pin/12-pin interface conversion adapter so as to connect the 8th pin of the 36-pin connector to the 11th pin of the 12-pin connector. Since the focus position signal and extender position signal are respectively assigned to the 11th pin of the 12-pin parallel interface and the 8th pin of the 36-pin parallel interface, the following problem is posed in the parallel interface mode. That is, in use of a large television lens having a serial communication function in a portable television camera having no serial communication function, i.e., a parallel interface, when the 36-pin/12-pin interface conversion adapter is used, the portable television camera erroneously detects the extender position signal from the large television lens as a focus position signal.

SUMMARY OF THE INVENTION

One aspect of the application is to provide a system, adapter, and lens to cope with parallel and serial communications between a camera and lens having different numbers of pins.

One aspect of the application is to provide a photographic system for connecting a camera and a second lens unit via an adapter device, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device connecting a first terminal of the camera, which is used as a terminal for first information in parallel communication and a terminal for serial communication in communicating information serially, to a first terminal of the second lens unit, which is used as a terminal for transmitting the first information in the parallel communication, and connecting a second terminal of the camera, which is used as a terminal of the camera for second information in the parallel communication, to a second terminal of the second lens unit, which is used as a terminal of the camera for the second information in the parallel communication and a terminal for serial communication in communicating information serially, and the photographic system allowing compatible connection between the camera and second lens unit in parallel communication, comprising a changeover switch which connects the first terminal of the camera and the second terminal of the second lens unit, thereby eliminating the conventional drawback described above.

One aspect of the application is to provide an adapter device for connecting a camera and a second lens unit, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device connecting a first terminal of the camera, which is used as a terminal for first information in parallel communication and a terminal for serial communication in communicating information serially, to a first terminal of the second lens unit, which is used as a terminal for the first information in the parallel communication, and connecting a second terminal of the camera, which is used as a terminal for second information in the parallel communication, to a second terminal of the second lens unit, which is used as a terminal for the second information in the parallel communication and a terminal for serial communication in communicating information serially, and the adapter device allowing compatible connection between the camera and second lens unit in parallel communication, comprising a changeover switch which connects the first terminal of the camera and the second terminal of the second lens unit, thereby eliminating the conventional drawback described above.

One aspect of the application is to provide a photographic system for connecting a camera and a second lens unit via an adapter device, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device connecting a first terminal of the camera, which is used as a terminal for transmitting first information in parallel communication, to a first terminal of the second lens unit, which is used as a terminal for transmitting the first information in the parallel communication and a terminal for serial communication in communicating information serially, and the photographic system allowing compatible connection between the camera and second lens unit in parallel communication, comprising a changeover switch which connects a second terminal of the camera, which is used as a terminal for serial communication, and the first terminal of the second lens unit, thereby eliminating the conventional drawback described above.

One aspect of the application is to provide an adapter device for connecting a camera and a second lens unit, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device connecting a first terminal of the camera, which is used as a terminal for first information in parallel communication, to a first terminal of the second lens unit, which is used as a terminal for the first information in the parallel communication and a terminal for serial communication in communicating information serially, and the adapter device allowing compatible connection between the camera and second lens unit in parallel communication, comprising a changeover switch which connects a second terminal of the camera, which is used as a terminal for serial communication, and the first terminal of the second lens unit, thereby eliminating the conventional drawback described above.

One aspect of the application is to provide a photographic system for connecting a camera and a second lens unit via an adapter device, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device connecting a first terminal of the camera, which is used as a terminal for first information in parallel communication and a terminal for serial communication in communicating information serially, to a first terminal of the second lens unit, which is used as a terminal for the first information in the parallel communication, and connecting a second terminal of the camera to a second terminal of the second lens unit, which is used as a terminal for serial communication in communicating information serially, and the photographic system allowing compatible connection between the camera and second lens unit in parallel communication, comprising a changeover switch which connects a serial communication line in the second lens unit to a first terminal of the second lens unit, thereby eliminating the conventional drawback described above.

One aspect of the application is to provide a first lens unit connected to a camera via an adapter device, the camera having a plurality of terminals compatible with a first lens unit having a plurality of terminals and having parallel and serial communication functions with the first lens unit via the pluralities of terminals, the lens unit having a terminal arrangement different from that of the first lens unit, and the adapter device connecting a first terminal of the camera, which is used as a terminal for first information in parallel communication and a terminal for serial communication in communicating information serially, to a first terminal of the lens unit, which is used as a terminal for the first information in the parallel communication, and connecting a second terminal of the camera to a second terminal of the lens unit, which is used as a terminal for serial communication in communicating information serially, and the lens unit allowing compatible connection between the camera and lens unit in parallel communication, comprising a changeover switch which connects a serial communication line in the lens unit to a first terminal of the lens unit, thereby eliminating the conventional drawback described above.

One aspect of the application is to provide a photographic system for connecting a camera and a second lens unit via an adapter device, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device connecting a first terminal of the camera, which is used as a terminal for first information in parallel communication, to a first terminal of the second lens unit, which is used as a terminal for the first information in the parallel communication and a terminal for serial communication in communicating information serially, and the photographic system allowing compatible connection between the camera and second lens unit in parallel communication, comprising a changeover switch which connects a serial line in the second lens unit to a second terminal of the camera, which is used as a terminal for serial communication, and a second terminal of the second lens unit, which is connected via the adapter device, thereby eliminating the conventional drawback described above.

One aspect of the application is to provide a lens unit connected to a camera via an adapter device, the camera having a plurality of terminals compatible with a first lens unit having a plurality of terminals and having parallel and serial communication functions with the first lens unit via the pluralities of terminals, the lens unit having a terminal arrangement different from that of the first lens unit, and the adapter device connecting a first terminal of the camera, which is used as a terminal for first information in parallel communication, to a first terminal of the lens unit, which is used as a terminal for the first information in the parallel communication and a terminal for serial communication in communicating information serially, and the lens unit allowing compatible connection between the camera and lens unit in parallel communication, comprising a changeover switch which connects a serial line in the lens unit to a second terminal of the camera, which is used as a terminal for serial communication, and a second terminal of the lens unit, which is connected via the adapter device, thereby eliminating the conventional drawback described above.

One aspect of the application is to provide a photographic system for connecting a camera and a second lens unit via an adapter device, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device making the terminals of the camera and second lens unit compatible with each other in the parallel communication to allow parallel communication between the camera and second lens, comprising a changeover switch which uses a predetermined terminal, of the camera connected to a terminal of the second lens unit in parallel communication and used as a terminal for parallel communication, as a terminal for serial communication in communicating information serially, and connects a serial line in the second lens unit to the predetermined terminal of the camera in serial communication, thereby eliminating the conventional drawback described above.

One aspect of the application is to provide an adapter device for connecting a camera and a second lens unit, the camera having a plurality of terminals compatible with a first lens unit having a plurality of terminals and having parallel and serial communication functions with the first lens unit via the pluralities of terminals, the second lens unit having a terminal arrangement different from that of the first lens unit, and the adapter device making the terminals of the camera and second lens unit compatible with each other in the parallel communication to allow parallel communication between the camera and second lens, comprising a changeover switch which switches, in serial communication, a parallel/serial terminal of the camera, which is connected to a predetermined terminal of the second lens unit by the adapter device in parallel communication and used as a terminal for parallel communication, to another terminal of the second lens unit, which is connected to a serial line of the second lens unit, thereby eliminating the conventional drawback described above.

DETAILED DESCRIPTION OF THE PREFERRED EMBODIMENTS

First Embodiment

The first embodiment of the present invention will be described below with reference to the accompanying drawings.

Figure 1:
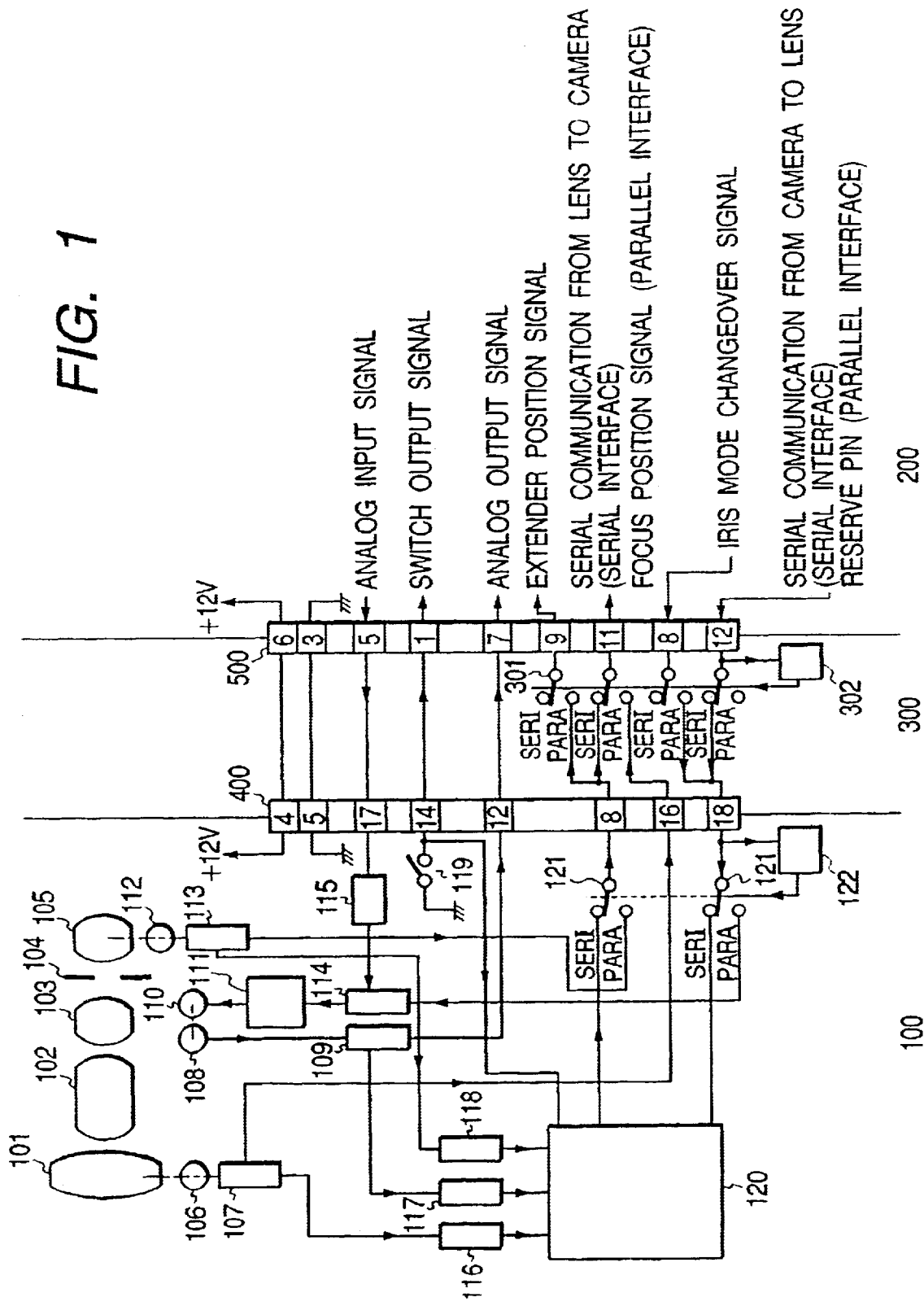
FIG. 1. is a block diagram of an arrangement between a large television lens and portable television camera according to the first embodiment of the present invention.

FIG. 1 is a block diagram of an interface between a portable television camera and large television lens according to the first embodiment of the present invention.

Referring to FIG. 1, a 36-pin/12-pin interface conversion adapter 300 connects a large television lens 100 to a portable television camera 200. A 36-pin connector (only the 4th, 5th, 8th, 12th, 14th, 16th, 17th, and 18th pins are shown, and an illustration of the remaining pins is omitted) 400 connects the large television lens 100 to the 36-pin/12-pin interface conversion adapter 300. A 12-pin connector (only the 1st, 3rd, 5th, 6th, 7th, 8th, 9th, 11th, and 12th pins are shown, and an illustration of the remaining pin is omitted) 500 connects the portable television camera 200 to the 36-pin/12-pin interface conversion adapter 300. Note that the lens 100 can be connected to a large camera (36 pins) directly without connecting the 36-pin connector of the camera and the 36-pin connector of the lens via an adapter.

The internal arrangement of the large television lens 100 will be described below.

The large television lens 100 has a focus lens group 101 for performing focus control, zoom lens group 102 for performing zooming, relay lens group 103 for imaging control, iris blades 104 for adjusting the stop, and extender lens group 105 for converting the magnification range. These lens groups constitute the optical system of the large television lens 100.

A focus position detector 106 detects the position of the focus lens group 101. A focus position signal calculation portion 107 performs arithmetic operation for a signal from the focus position detector 106. Components 108 to 115 (to be described later) are required for each of the iris and zoom portions, but are represented by single components, respectively. The analog position detector 108 detects the position of the stop of the iris blades 104 and the position of the zoom lens group 102. The analog position signal calculation portion 109 performs arithmetic operation for a signal from the analog position detector 108. The motor 110 drives the iris blades 104 an the zoom lens group 102. The driver circuit 111 drives the motor 110. The extender position detector 112 detects the position of the extender lens group. The extender position signal calculation portion 113 performs arithmetic operation for a signal from the extender position detector 112. The iris servo gain converter (not required in a zoom servo system) 114 changes the gain of the iris servo system in accordance with an iris mode changeover signal from the portable television camera 200. The analog control signal calculation portion 115 performs arithmetic operation for a control signal from the portable television camera 200. A/D converters 116, 117, and 118 supply signals from the focus position signal calculation portion 107, analog signal position calculation portion 109, and extender position signal calculation portion 113, respectively, to a CPU 120 (to be described later). A switch 119 has the main function of ON/OFF-switching VTR recording. The CPU 120 controls the serial communication function. A 36-pin interface changeover portion 121 switches the 36-pin serial interface and 36-pin parallel interface. An interface determination portion 122 determines by the presence/absence of a serial communication signal whether the connected portable television camera 200 has a serial or parallel interface, and controls the 36-pin interface changeover portion 121.

The internal arrangement of the 36-pin/12-pin interface conversion adapter 300 will be described below.

A 12-pin interface changeover portion 301 switches the 12-pin serial interface and 12-pin parallel interface. An interface determination portion 302 determines whether the connected portable television camera 200 has a serial or parallel interface, and controls the 12-pin interface changeover portion 301.

In the above arrangement, when the portable television camera 200 has a 12-pin serial interface, a serial communication signal is output from the 12th pin of the 12-pin connector 500. This serial communication signal is detected by the interface determination portion 302 in the 36-pin/12-pin interface conversion adapter 300 to switch the 12-pin interface changeover portion 301 to the serial interface mode. The serial communication signal output from the portable television camera 200 passes through the 18th pin of the 36-pin connector 400 and is input to the large television lens 100. In the large television lens 100, the serial communication signal is detected by the interface determination portion 122 to switch the 36-pin interface changeover portion 121 to the serial interface mode.

When the portable television camera 200 is not compatible with the 12-pin serial interface, no serial communication signal is output from the 12th pin of the 12-pin connector 500. Since the interface determination portion 302 in the 36-pin/12-pin interface conversion adapter 300 can detect no serial communication signal, the interface of the portable television camera 200 is determined as a parallel interface to switch the 12-pin interface changeover portion 301 to the parallel interface mode. Since no serial communication signal can be detected by the interface determination portion 122 in the large television lens 100, either, the interface determination portion 122 determines the interface of the portable television camera 200 as a parallel interface to switch the 36-pin interface changeover portion 121 to the parallel interface mode.

In the first embodiment, the interface determination portion 302 in the 36-pin/12-pin interface conversion adapter 300 detects the serial communication signal to switch the 12-pin interface changeover portion 301. However, the 12-pin interface changeover portion 301 may be manually switched. In this case, a changeover member is mounted on the adapter 300 to allow manual changeover.

In the first embodiment, the interface determination portion 302 in the 36-pin/12-pin interface conversion adapter 300 detects the serial communication signal to switch the 12-pin interface changeover portion 301. However, these operations may be performed on the portable television camera 200 side.

As described above, one of the 36-pin/12-pin interface conversion adapter interposed between the large television lens and portable television camera includes a means for determining whether the camera has a serial or parallel interface and an interface changeover means. Any connection errors of the serial and parallel interfaces in connection of the serial interface compatible large television lens to the portable television camera can be eliminated.

Second Embodiment

In the first embodiment, the 36-pin/12-pin interface conversion adapter interposed between the large television lens and portable television camera has the serial/parallel interface changeover function. In the second embodiment, however, a large television lens has the interface changeover function.

The second embodiment of the present invention will be described with reference to FIG. 2.

Figure 2:
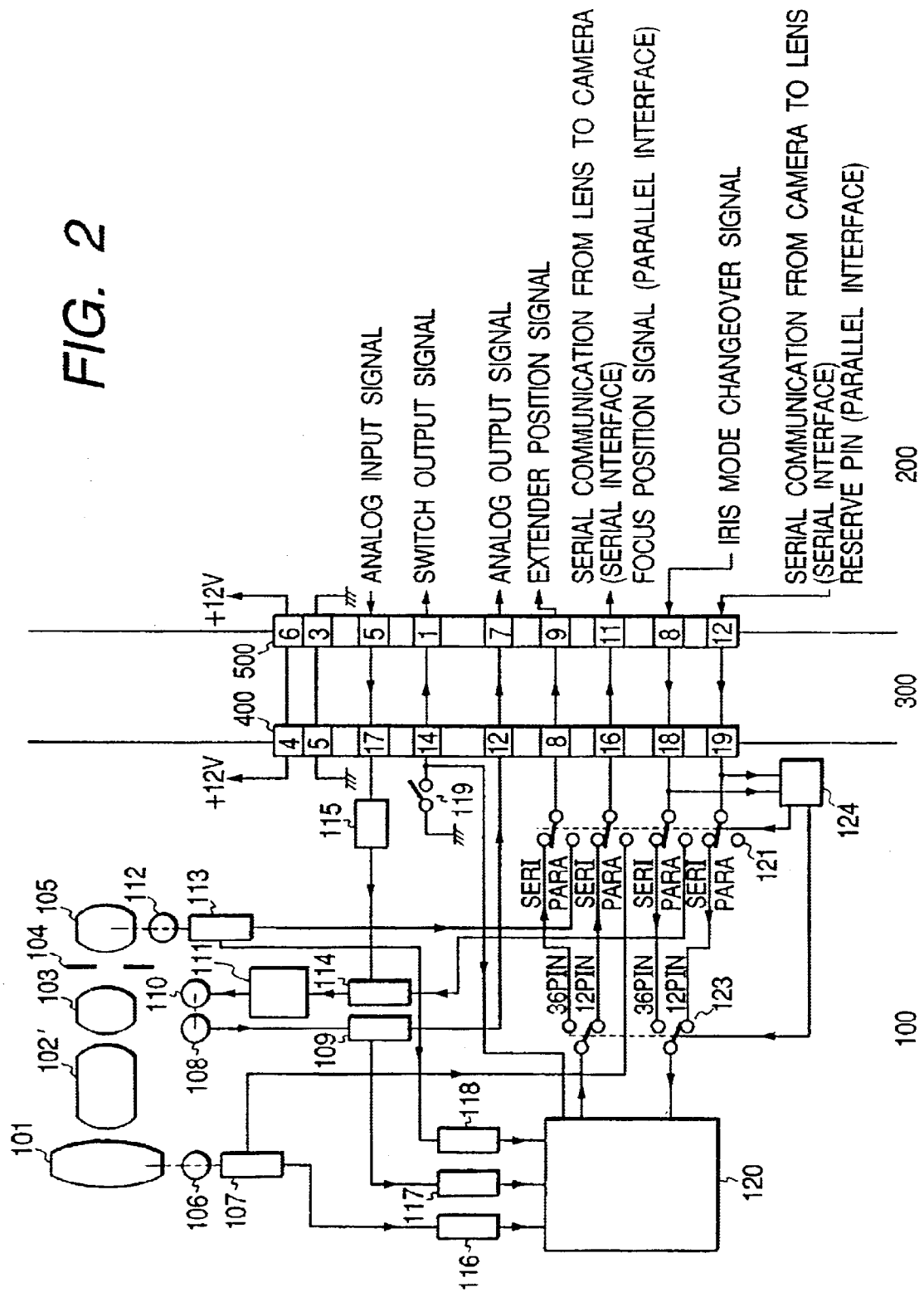
FIG. 2 is a block diagram of an arrangement between a large television lens and portable television camera according to the second embodiment of the present invention.

FIG. 2 is a block diagram of an interface between a portable television camera and large television lens according to the second embodiment of the present invention.

Referring to FIG. 2, a 36-pin/12-pin interface conversion adapter 300 connects a large television lens 100 to a portable television camera 200. A 36-pin connector (only the 4th, 5th, 8th, 12th, 14th, 16th, 17th, 18th and 19th pins are shown, and an illustration of the remaining pins is omitted) 400 connects the large television lens 100 to the 36-pin/12-pin interface conversion adapter 300. A 12-pin connector (only the 1st, 3rd, 5th, 6th, 7th, 8th, 9th, 11th, and 12th pins are shown, and an illustration of the remaining pin is omitted) 500 connects the portable television camera 200 to the 36-pin/12-pin interface conversion adapter 300.

The internal arrangement of the large television lens 100 will be described below.

Components 101 to 121 are identical to those in the first embodiment, and a detailed description thereof will be omitted.

A serial communication changeover portion 123 changes pin assignment of the serial communication function in accordance with a television camera connected to the lens. An interface determination portion 124 determines based on the presence/absence of serial communication data whether the connected television camera 200 has a 12-pin serial interface, 36-pin serial interface, or parallel interface and controls the 36-pin interface changeover portion 121 and a serial communication changeover portion 123.

The 36-pin/12-pin interface conversion adapter 300 is a conventional one in which wiring lines are changed only for matching between the 36-pin parallel interface and 12-pin parallel interface.

In the above arrangement, when the portable television camera 200 is compatible with the 12-pin serial interface, a serial communication signal is input to the 19th pin of the 36-pin connector 400 via the 12th pin of the 12-pin connector 500. This serial communication signal is detected by the interface determination portion 124 in the large television lens 100 to switch the 36-pin interface changeover portion 124 to the serial interface mode. At the same time, the interface determination portion 124 also detects the serial communication signal input from the 19th pin side of the 36-pin connector 400 to switch the serial communication changeover portion 123 to 12-pin interface side and to perform the serial communication mode.

When the portable television camera 200 is not compatible with the 12-pin serial interface, no serial communication signal is input from the 12th pin of the 12-pin connector 500 and the 19th pin of the 36-pin connector 400. Since the interface determination portion 124 in the large television lens 100 detects no serial communication signal, the interface of the camera is determined as a parallel interface to switch the 36-pin interface changeover portion 121 to the parallel interface mode.

Figure 3:
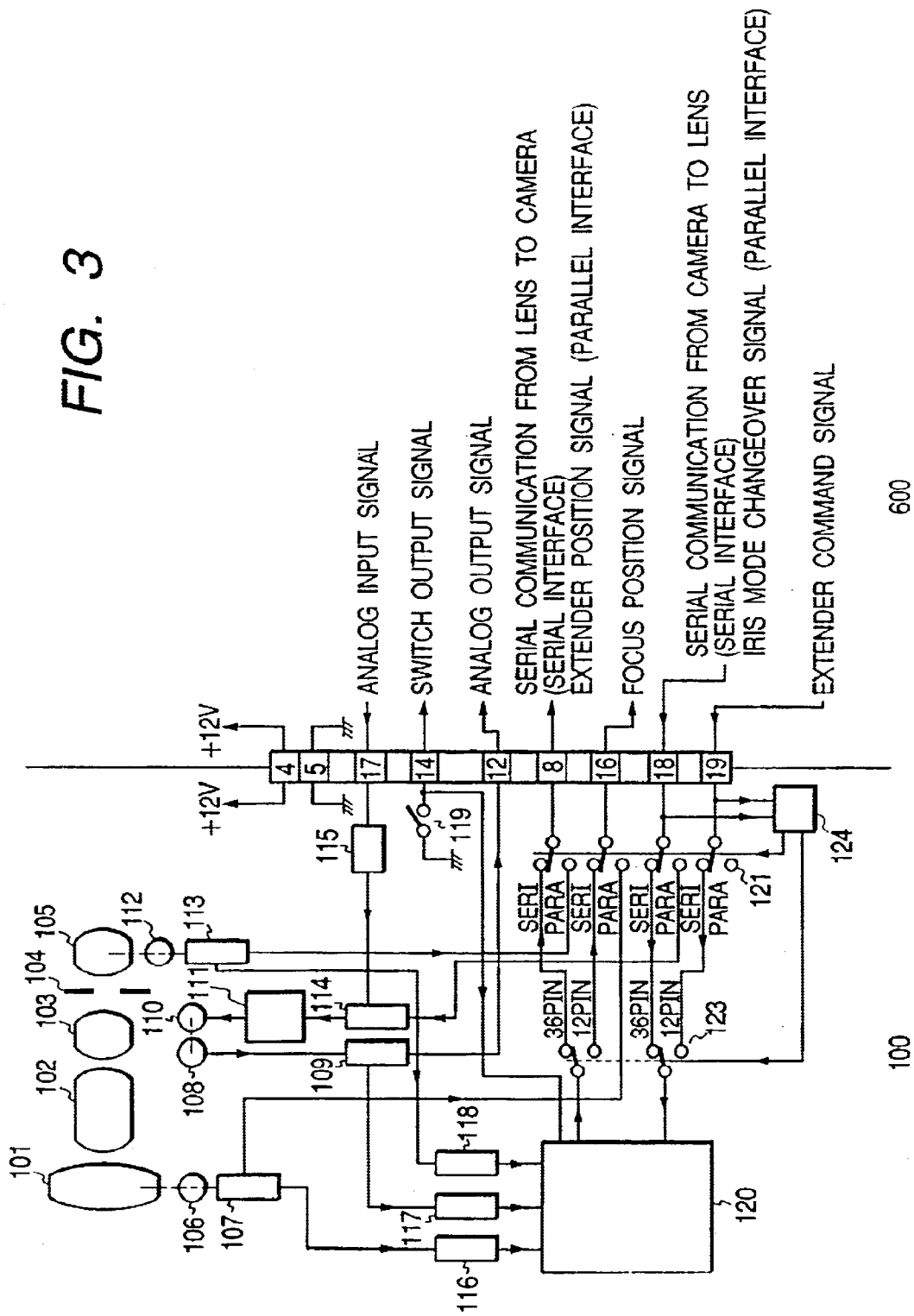
FIG. 3 is a block diagram of an arrangement between a large television lens and large television camera according to the second embodiment of the present invention.
Figure 4:
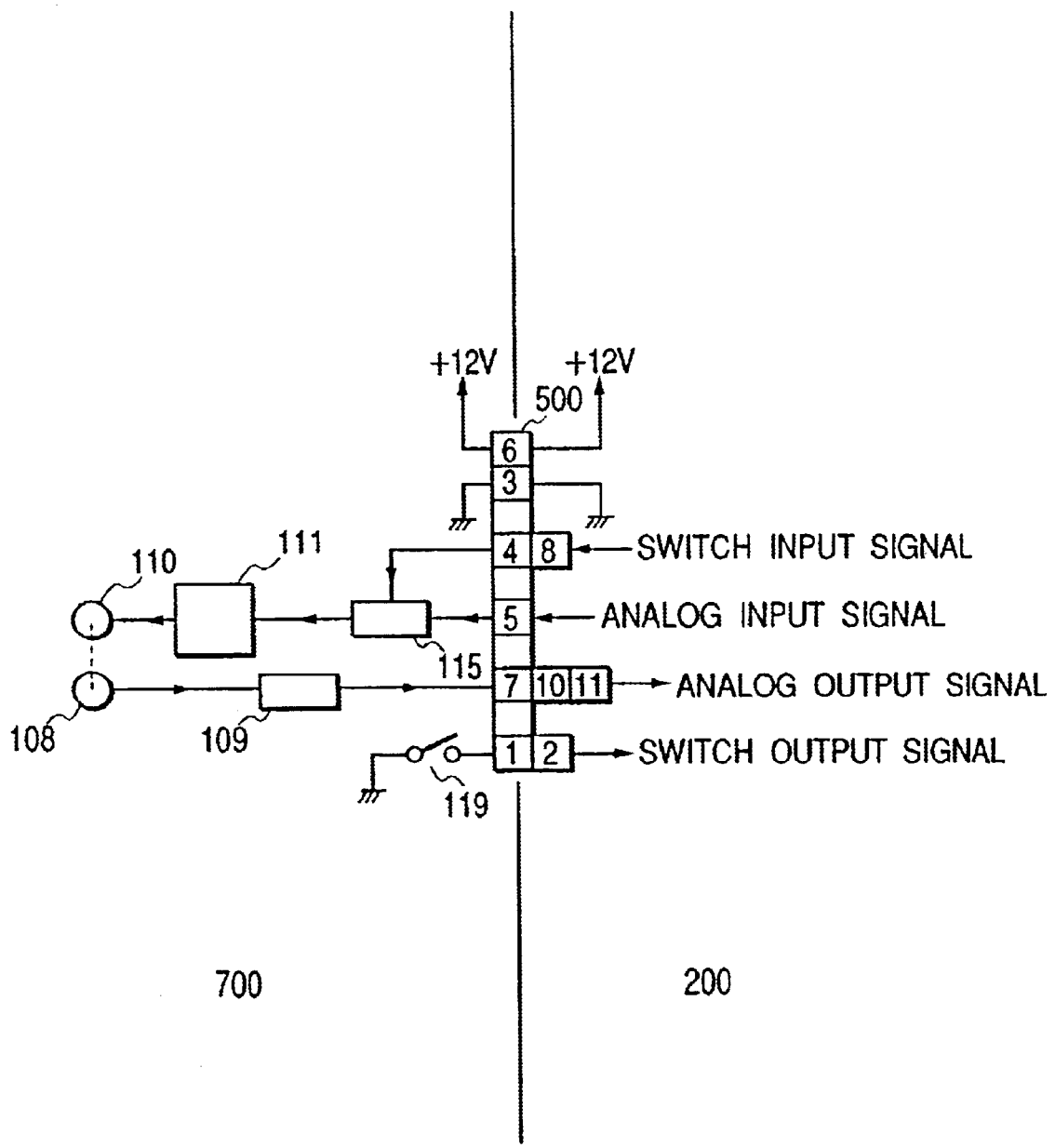
FIG. 4 is a block diagram of a conventional arrangement between a television lens and television camera.

FIG. 3 is a block diagram when the large television lens of the second embodiment is used for a large television camera.

As shown in FIG. 3, a large television camera 600 and the large television lens 100 have 36-pin interfaces. In this case, no 36-pin/12-pin interface conversion adapter is used.

In the above arrangement, when the large television camera 600 is compatible with the 36-pin serial interface, a serial communication signal is input from the 18th pin of the 36-pin connector 400. This serial communication signal is detected by the interface determination portion 124 in the large television lens 100 to switch the 36-pin interface changeover portion 121 to the serial interface mode. At the same time, the interface determination portion 124 also detects the serial communication signal input from the 18th pin side of the 36-pin connector 400 to switch the serial communication changeover portion 123 to 36-pin interface side and to perform the serial communication mode.

When the large television camera 600 is not compatible with the 36-pin serial interface, no serial communication signal is input from the 18th pin of the 36-pin connector 400. Since the interface determination portion 124 in the large television lens 100 detects no serial communication signal, the interface of the camera is determined as a parallel interface to switch the 36-pin interface changeover portion 121 to the parallel interface mode.

In the second embodiment, the serial communication signal is detected by the interface determination portion 124 in the large television lens 100 to switch the 36-pin interface changeover portion 121 and serial communication changeover portion 123. However, the 36-pin interface changeover portion 121 and serial communication changeover portion 123 may be manually switched.

In the second embodiment, the interface determination portion 124 in the large television lens 100 detects the serial communication signal to switch the 36-pin interface changeover portion 121 and serial communication changeover portion 123. However, these operations may be performed on the portable television lens 200 side.

As has been described above, a means for determining whether the interface of the camera is a parallel or serial interface, a means for determining whether the serial interface is a 12-pin or 36-pin serial interface, and interface changeover means are arranged in the large television lens.

Any connection errors of the serial and parallel interfaces in connection of the serial interface compatible large television lens to the portable television camera can be eliminated.

What is claimed is:

1. A photographic system for connecting a camera and a second lens unit via an adapter device, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device connecting a first terminal of said camera, which is used as a terminal for first information in parallel communication and a terminal for serial communication in communicating information serially, to a first terminal of said second lens unit, which is used as a terminal for the first information in the parallel communication, and connecting a second terminal of said camera, which is used as a terminal for second information in the parallel communication, to a second terminal of said second lens unit, which is used as a terminal for the second information in the parallel communication and a terminal for serial communication in communicating information serially, and said photographic system allowing compatible connection between said camera and second lens unit in parallel communication, comprising a changeover switch which connects said first terminal of said camera and said second terminal of said second lens unit.

2. A system according to claim 1, wherein said changeover switch disconnects said first terminal of said second lens unit from said first terminal of said camera and disconnects said second terminal of said second lens unit from said second terminal of said camera.

3. A system according to claim 1, wherein the number of terminal of said camera is different from that of said second lens unit.

4. A system according to claim 1, wherein said changeover switch operates in response to serial communication from said camera.

5. An adapter device for connecting a camera and a second lens unit, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device connecting a first terminal of said camera, which is used as a terminal for first information in parallel communication and a terminal for serial communication in communicating information serially, to a first terminal of said second lens unit, which is used as a terminal for the first information in the parallel communication, and connecting a second terminal of said camera, which is used as a terminal for second information in the parallel communication, to a second terminal of said second lens unit, which is used as a terminal for the second information in the parallel communication and a terminal for serial communication in communicating information serially, and said adapter device allowing compatible connection between said camera and second lens unit in parallel communication, comprising a changeover switch which connects said first terminal of said camera and said second terminal of said second lens unit.

6. A device according to claim 5, wherein said changeover switch disconnects said first terminal of said second lens unit from said first terminal of said camera and disconnects said second terminal of said second lens unit from said second terminal of said camera.

7. A device according to claim 5, wherein said changeover switch operates in response to serial communication from said camera.

8. A photographic system for connecting a camera and a second lens unit via an adapter device, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device connecting a first terminal of said camera, which is used as a terminal for first information in parallel communication, to a first terminal of said second lens unit, which is used as a terminal for the first information in the parallel communication and a terminal for serial communication in communicating information serially, and said system allowing compatible connection between said camera and second lens unit in parallel communication, comprising a changeover means which connects a second terminal of said camera, which is used as a terminal for serial communication, and said first terminal of said second lens unit.

9. A system according to claim 8, wherein said changeover switch disconnects said first terminal of said camera from said first terminal of said second lens unit.

10. A system according to claim 8 wherein said changeover switch operates in response to serial communication from said camera.

11. An adapter device for connecting a camera and a second lens unit, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device connecting a first terminal of said camera, which is used as a terminal for first information in parallel communication, to a first terminal of said second lens unit, which is used as a terminal for the first information in the parallel communication and a terminal for serial communication in communicating information serially, and said adapter device allowing compatible connection between said camera and second lens unit in parallel communication, comprising a changeover means which connects a second terminal of said camera, which is used as a terminal for serial communication, and said first terminal of said second lens unit.

12. A device according to claim 11, wherein said changeover switch disconnects said first terminal of said camera from said first terminal of said second lens unit.

13. A device according to claim 11 wherein said changeover switch operates in response to serial communication from said camera.

14. A photographic system for connecting a camera and a second lens unit via an adapter device, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device connecting a first terminal of said camera, which is used as a terminal for first information in parallel communication and a terminal for serial communication in communicating information serially, to a first terminal of said second lens unit, which is used as a terminal for the first information in the parallel communication, and connecting a second terminal of said camera to a second terminal of said second lens unit, which is used as a terminal for serial communication in communicating information serially, and said system allowing compatible connection between said camera and second lens unit in parallel communication, comprising a changeover switch which connects a serial communication line in said second lens unit to a first terminal of said second lens unit.

15. A system according to claim 14, wherein said second terminal of said second lens unit is connected to the serial line in said lens, and said second terminal is disconnected from the serial line by said changeover switch.

16. A system according to claim 14 wherein said changeover switch operates in response to serial communication from said camera.

17. A lens unit connected to a camera via an adapter device, said camera having a plurality of terminals compatible with a first lens unit having a plurality of terminals and having parallel and serial communication functions with said first lens unit via said pluralities of terminals, said lens unit having a terminal arrangement different from that of said first lens unit, and said adapter device connecting a first terminal of said camera, which is used as a terminal for first information in parallel communication and a terminal for serial communication in communicating information serially, to a first terminal of said lens unit, which is used as a terminal for the first information in the parallel communication, and connecting a second terminal of said camera to a second terminal of said lens unit, which is used as a terminal for serial communication in communicating information serially, and said lens unit allowing compatible connection between said camera and lens unit in parallel communication, comprising a changeover switch which connects a serial communication line in said lens unit to a first terminal of said lens unit.

18. A device according to claim 17, wherein said second terminal of said second lens unit is connected to the serial line in said lens, and said second terminal is disconnected from the serial line by said changeover switch.

19. A unit according to claim 17, wherein the number of terminals of said camera is different from that of said lens unit.

20. A unit according to claim 17 wherein said changeover switch operates in response to serial communication from said camera.

21. A photographic system for connecting a camera and a second lens unit via an adapter device, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device connecting a first terminal of said camera, which is used as a terminal for first information in parallel communication, to a first terminal of said second lens unit, which is used as a terminal for the first information in the parallel communication and a terminal for serial communication in communicating information serially, and said system allowing compatible connection between said camera and second lens unit in parallel communication, comprising a changeover switch which connects a serial line in said second lens unit to a second terminal of said second lens unit, which is connected to a second terminal of said camera used as a terminal for serial communication via said adapter device.

22. A system according to claim 21, wherein said first terminal of said second lens unit is connected to the serial line in said lens, and said first terminal is disconnected from the serial line by said changeover switch.

23. A device according to claim 21 wherein said changeover switch operates in response to serial communication from said camera.

24. A lens unit connected to a camera via an adapter device, said camera having a plurality of terminals compatible with a first lens unit having a plurality of terminals and having parallel and serial communication functions with said first lens unit via said pluralities of terminals, said lens unit having a terminal arrangement different from that of said first lens unit, and said adapter device connecting a first terminal of said camera, which is used as a terminal for first information in parallel communication, to a first terminal of said lens unit, which is used as a terminal for the first information in the parallel communication and a terminal for serial communication in communicating information serially, and said lens unit allowing compatible connection between said camera and lens unit in parallel communication, comprising a changeover switch which connects a serial line in said lens unit to a second terminal of said lens unit which is connected to a second terminal of camera used as a terminal for serial communication via said adapter device.

25. A unit according to claim 24, wherein said first terminal of said lens unit is connected to the serial line in said lens, and said first terminal is disconnected from the serial line by said changeover switch.

26. A unit according to claim 24 wherein said changeover switch operates in response to serial communication from said camera.

27. A photographic system for connecting a camera and a second lens unit via an adapter device, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device making said terminals of said camera and second lens unit compatible with each other in the parallel communication to allow parallel communication between said camera and second lens, comprising a changeover switch which uses a predetermined terminal, of said camera connected to a terminal of said second lens unit in parallel communication, as a terminal for serial communication in communicating information serially, and connects a serial line in said second lens unit to said predetermined terminal of said camera in serial communication.

28. An adapter device for connecting a camera and a second lens unit, said camera having a plurality of terminals compatible with a first lens unit having a plurality of terminals and having parallel and serial communication functions with said first lens unit via said pluralities of terminals, said second lens unit having a terminal arrangement different from that of said first lens unit, and said adapter device making said terminals of said camera and second lens unit compatible with each other in the parallel communication to allow parallel communication between said camera and second lens, comprising a changeover switch which switches, in serial communication, a parallel/serial terminal of said camera, which is connected to a predetermined terminal of said second lens unit by said adapter device in parallel communication and used as a terminal for parallel communication, to another terminal of said second lens unit, which is connected to a serial line of said second lens unit.

29. A lens unit connectable via an adapter device to a camera having a plurality of terminals, and having a plurality of terminals with functions for parrallel communicating information and serially communicating information with said camera, wherein said lens unit is adapted to communicate with said camera on a parallel communication by connecting thereof in such a manner that a first terminal of said camera which is used for communicating a first information on said parallel communication, is connected to a first terminal of said lens unit which is used for communicating said first information on said parallel communication and is used for serially communicating an information on a serial communication, and comprises changeover means for connecting said first terminal of said lens unit and a second terminal of said camera which is used for said serial communication.

30. A lens unit according to claim 29, wherein said lens unit has said terminals of which number is different from that of said terminal of said camera.

31. A lens unit according to claim 29, wherein said change over means act in accordance with said serial communication from said camera.

32. A lens unit according to claim 29, wherein said change over means cut off the connection between said first terminal of said lens unit and said first terminal of said camera, and cut off the communication between a second terminal of said lens unit and said second terminal of said camera.

* * * * *